Figure 1:
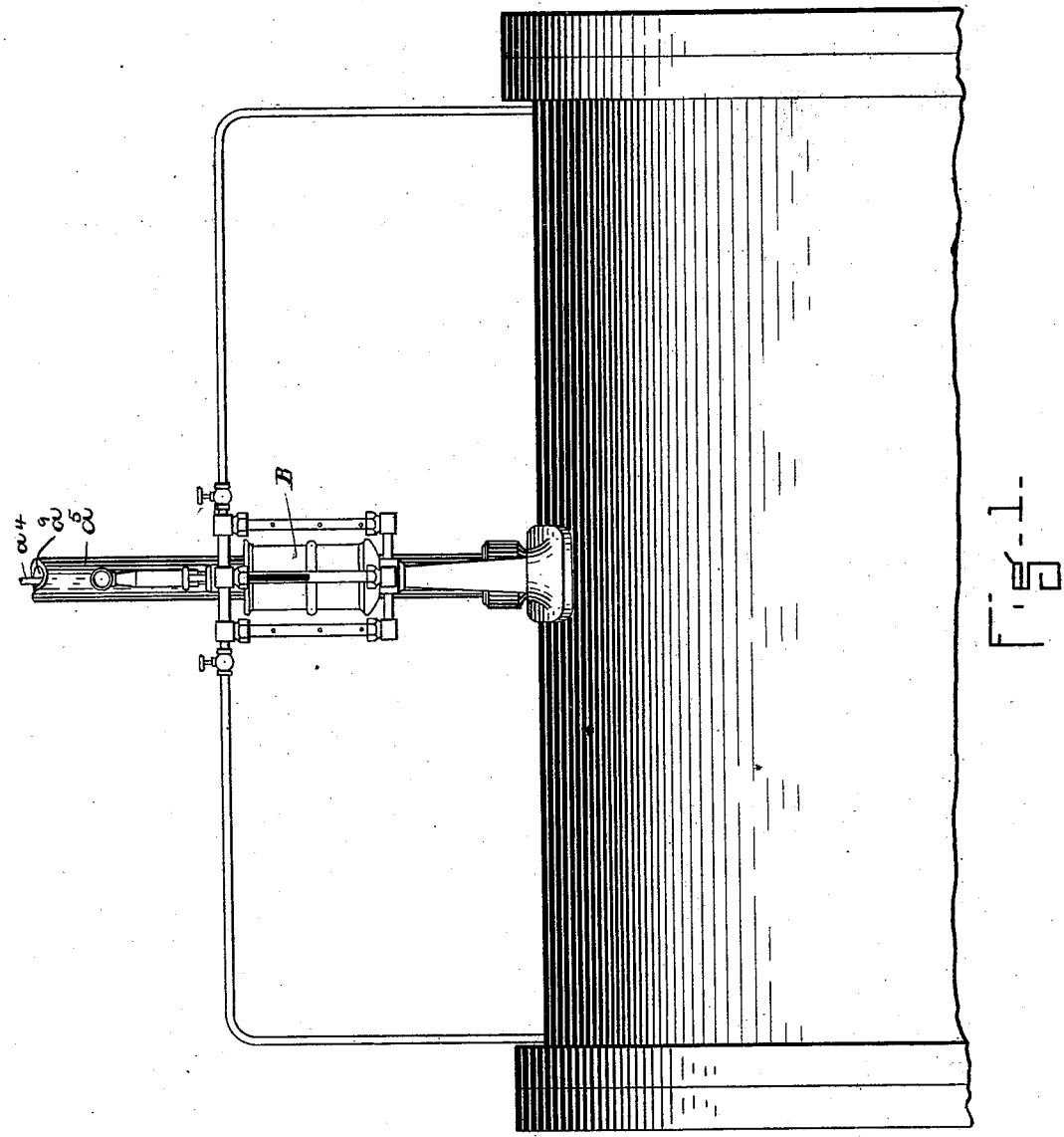

(No Model.) 2 Sheets—Sheet 1.

G. H. MUSGRAVE.
LUBRICATOR.

No. 466,572. Patented Jan. 5, 1892.

WITNESSES.
J. M. Dolan.
W. H. Whitney.

INVENTOR
Geo. H. Musgrave
by his attys
Clarke & Raymond.

(No Model.)  2 Sheets—Sheet 2.
G. H. MUSGRAVE.
LUBRICATOR.
No. 466,572. Patented Jan. 5, 1892.
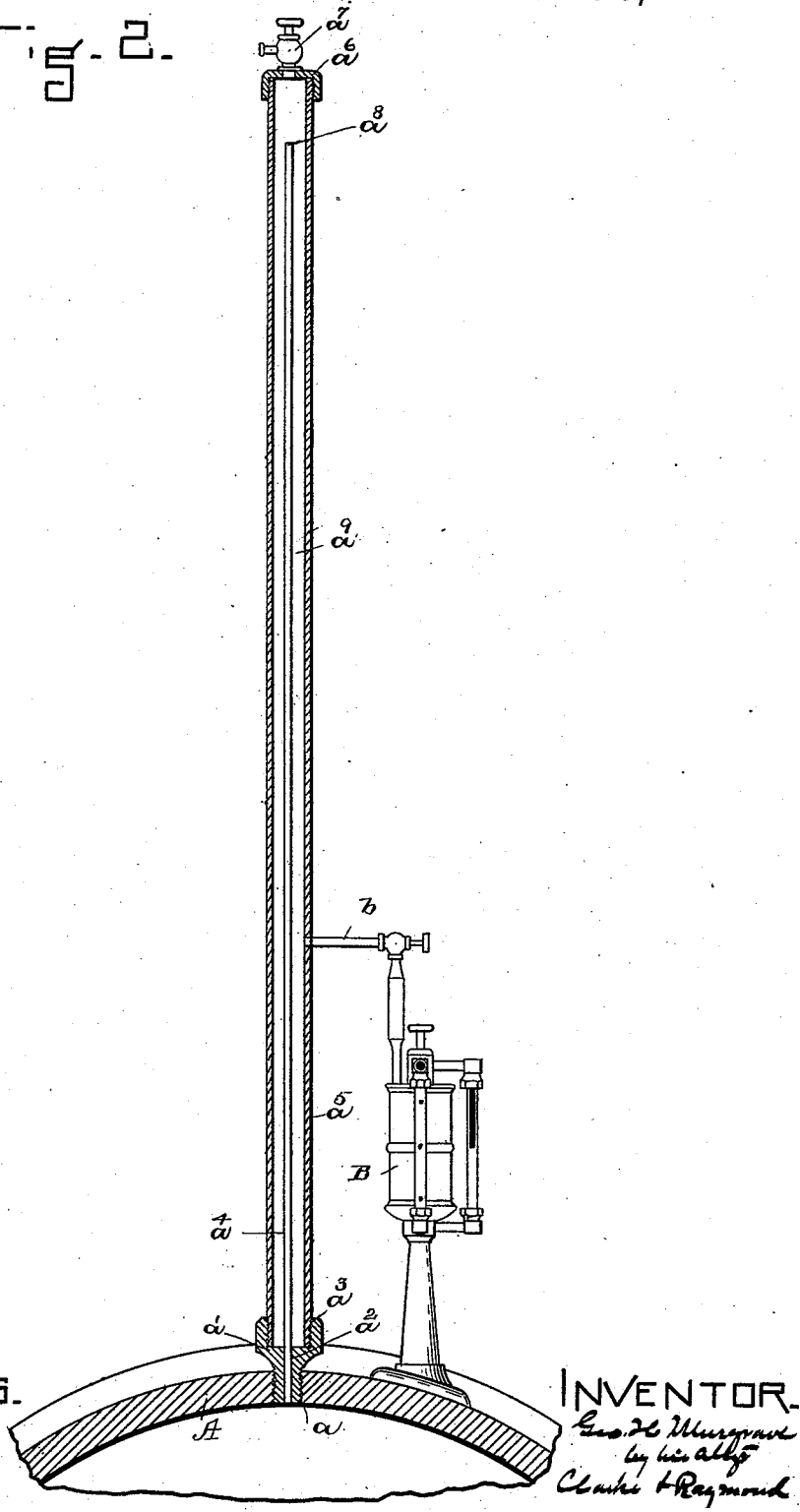
WITNESSES.
J. H. Dolan
W. H. Whitney
INVENTOR.
Geo. H. Musgrave
by his atty
Clarke & Raymond

UNITED STATES PATENT OFFICE.

GEORGE H. MUSGRAVE, OF SOMERVILLE, MASSACHUSETTS.

LUBRICATOR.

SPECIFICATION forming part of Letters Patent No. 466,572, dated January 5, 1892.

Application filed March 10, 1891. Serial No. 384,480. (No model.)

*To all whom it may concern:*

Be it known that I, GEORGE H. MUSGRAVE, of Somerville, in the county of Middlesex and State of Massachusetts, a citizen of the United States, have invented a new and useful Improvement in Lubricators, of which the following is a full, clear, and exact description, reference being had to the accompanying drawings, forming a part of this specification, in explaining its nature.

Heretofore, so far as I am aware, sight-feed lubricators for lubricating the various cylinders of compound engines have been connected with the various cylinders in two ways. In one each lubricator took its steam for supplying its hydrostatic column from the dry pipe, which of course delivered to the various lubricators steam of the highest pressure, and as the steam-pressure diminishes in each of the cylinders after the first it followed that the lubricators connected with the second and third cylinders, having an excess of pressure upon the dry-pipe side, were unbalanced and did not work properly. In the other the various lubricators took steam for their hydrostatic columns, the first from the dry pipe and the others from the cylinder with which they were respectively connected, or used steam of about the pressure of such cylinder; but as the means of connection was of the ordinary kind, such as is usually employed in connecting a lubricator with the dry pipe, the desired result was not reached, a substantially uniform and continuous supply of steam not being obtainable from this source, and the shutting off of the steam from the first cylinder and other action of the engine often producing a vacuum upon the steam-supply side of the lubricators which exhausted the water column and oil of the lubricators.

My invention overcomes these defects in the operation of sight-feed lubricators applied to the cylinders of compound engines in the following manner, namely: by providing each of the lubricators used with an auxiliary or additional hydrostatic column considerably higher than that of the lubricator it supplies, arranged to receive its steam at a pressure approximating that into which the lubricator discharges, and connected with the steam-supply and with the lubricator in a manner to avoid all possibility of a vacuum upon the steam-supply side exhausting or drawing off the water column. This insures that each of the various lubricators used for lubricating the various cylinders of a compound engine shall be independent of each other, shall be provided with a separate auxiliary non-exhaustible water column for feeding its usual water column, and shall be run under steam-pressures well balanced upon each side of the lubricator, and shall therefore feed oil steadily and uniformly at proper speed and with no liability of waste.

I have represented the invention as carried into effect by a comparatively simple means or attachment, comprising a relatively long vertical pipe closed at both ends, preferably erected upon the cylinder from which it receives steam, and connected with such cylinder by an interior pipe of relatively small bore, which extends to near the top of the first-named pipe, the steam from the cylinder or steam-supply entering said first-named pipe near its upper end through the interior feed-pipe and condensing in said outer pipe, forming a high-water column. This auxiliary water column is connected with the water column of the lubricator by a branch pipe extending from the vertical pipe at some distance below the discharge-opening of the steam-supply pipe, and this pipe runs horizontally to the water column of the lubricator, so that the auxiliary water column is considerably higher than the water column proper of the lubricator, and there is thereby provided the lubricator an inexhaustible independent means of feeding its water column under all conditions and one which cannot be exhausted by a vacuum.

In the drawings, Figure 1 is a view in side elevation of a cylinder equipped with my invention. Fig. 2 is a view in transverse vertical section further illustrating my invention.

The cylinder A has tapped through it the hole $a$, into which is screwed the post $a'$. This post has the hole $a^2$ extending through it and also a short threaded hole $a^3$ extending from its upper end. Into the hole $a^2$ there is fitted the long vertical tube $a^4$ of small bore. Into the recess $a^3$ there is screwed the long vertical tube or pipe $a^5$ of comparatively large bore and of a length to extend slightly above the upper end of the small tube which it incloses. It is closed at its top by a cap $a^6$, in which there is an air-valve $a^7$. The vertical tube or pipe $a^5$ is connected with the water column of the lubricator B at a point considerably below the upper end $a^8$ of the inner tube by the horizontal pipe $b$, and the lubricator is connected with the cylinder steam chest or valve in the ordinary way. Any of the usual forms of hydrostatic sight-feed lubricators may be employed.

In operation the steam passes from the cylinder or other source of supply through the pipe $a^4$, entering the pipe $a^5$ at its upper end, condensing therein, and forming a relatively high-water column which fills the pipe $a^5$ to the steam-inlet. There is thus provided for the supply of the water column of the lubricator an independent auxiliary water column formed by the condensation of steam of substantially the pressure of the steam into which the lubricator discharges its lubricant. While I have represented these pipes as connected with the cylinder to be lubricated, I would say that they may be connected with the steam-chest of the cylinder or with any connection with the chest or cylinder which will provide steam at about the pressure of the steam chest or cylinder.

This invention is especially important in connection with engines having more than one cylinder, as it furnishes an independent auxiliary reservoir or water column for each lubricator, supplied by the condensation of steam from a source which is not continuous and liable to be displaced by a vacuum. It will be seen that by means of this auxiliary water column these important results are obtained: First, a vacuum at the source of steam-supply will not exhaust the water column in the chamber $a^9$ much below the top of the pipe $a^8$; second, there is always provided a continuous supply of water for the proper operation of the lubricator under all conditions; third, the difficulty arising from variations in the pressure at the inlet and outlet sides of the lubricator is avoided.

Having thus fully described my invention, I claim and desire to secure by Letters Patent of the United States—

1. As a means of connecting hydrostatic lubricators with cylinders or other sources of steam-supply and providing them with an independent auxiliary non-exhaustible water column, a relatively long vertical pipe or tube closed at the bottom and top and connected with the steam-cylinder or other source of steam-supply, a steam-supply pipe of comparatively small bore extending from the said cylinder or source of supply to near the top of the vertical pipe to furnish steam which is condensed in said pipe to form a water column therein, and a branch pipe extending from the vertical pipe considerably below the steam-inlet to the lubricator, whereby the independent water column is connected with the water column of the lubricator, as and purpose described.

2. As a means of connecting a sight-feed lubricator with the cylinder or its appurtenances which it is to lubricate, the post $a'$, having the hole $a^2$ and threaded recess $a^3$, the vertical pipe $a^4$ of small bore extending upward from the hole $a^2$, the vertical pipe or tube $a^5$ of relatively large bore inclosing the pipe $a^4$, screwing into the threaded hole $a^3$ and closed at its upper end, and a branch pipe extending from said pipe $a^5$ to the lubricator from a point considerably below the discharge end of the pipe $a^4$, as and for the purposes described.

GEORGE H. MUSGRAVE.

In presence of—
WILLIAM H. RANSOM,
WILLIAM H. DEKLYN.